US006780060B1

(12) United States Patent
Kajiura et al.

(10) Patent No.: US 6,780,060 B1
(45) Date of Patent: Aug. 24, 2004

(54) ELECTRICAL CONNECTOR WITH THERMAL SENSOR

(75) Inventors: Motomo Kajiura, Tokyo (JP); Ryosuke Takahashi, Kawasaki (JP); Hiroshi Masuda, Kanagawa (JP)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/638,119

(22) Filed: Aug. 14, 2000

(30) Foreign Application Priority Data

Aug. 13, 1999 (JP) .......................................... 11-229472

(51) Int. Cl.$^7$ .............................................. H01R 13/66
(52) U.S. Cl. ..................................... 439/620; 439/913
(58) Field of Search ............................... 439/488, 489, 439/159, 620, 67, 77, 913; 307/116, 125, 140; 374/181, 179, 182, 141

(56) References Cited

U.S. PATENT DOCUMENTS

| | | | | | |
|---|---|---|---|---|---|
| 4,444,063 A | * | 4/1984 | Snowden et al. | ...... | 73/862.326 |
| 4,508,399 A | * | 4/1985 | Dowling et al. | .............. | 439/67 |
| 4,776,706 A | * | 10/1988 | Loiterman et al. | .......... | 374/208 |
| 4,915,639 A | * | 4/1990 | Cohn et al. | .................. | 439/188 |
| 5,026,293 A | * | 6/1991 | Wilson | ....................... | 439/76.1 |
| 5,088,835 A | * | 2/1992 | Shigezawa et al. | ......... | 374/181 |
| 5,761,039 A | * | 6/1998 | Bruees et al. | ............... | 361/704 |
| 6,045,405 A | * | 4/2000 | Geltsch et al. | .............. | 439/620 |
| 6,089,891 A | * | 7/2000 | Nishioka | ..................... | 439/159 |
| 6,102,708 A | * | 8/2000 | Kimura | ....................... | 439/64 |
| 6,104,607 A | * | 8/2000 | Behl | ........................... | 361/687 |
| 6,139,361 A | * | 10/2000 | Przilas et al. | ............... | 439/559 |

FOREIGN PATENT DOCUMENTS

JP          7-36571          2/1995

* cited by examiner

Primary Examiner—P. Austin Bradley
Assistant Examiner—Edwin A. León
(74) Attorney, Agent, or Firm—Woodcock Washburn LLP

(57) ABSTRACT

A card connector system that detachably supports a PC card and electrically connects the PC card to an electrical device. The system includes a temperature sensor to monitor temperature of the PC card to prevent the deleterious effect of heat generated by the PC card on the PC card itself and the electrical device. The sensor detects the surface temperature of the supported PC card and transmits the obtained temperature information to the electrical device. In this case, it is preferable that a transition board 33, electrically connected between the PC card and the electrical device, is used to transmit the temperature information.

28 Claims, 6 Drawing Sheets

ELECTRICAL CONNECTOR WITH THERMAL SENSOR

BACKGROUND OF THE INVENTION

1. Field of the Invention

The present invention relates to electrical connectors. Specifically, the present invention relates to an electrical connector with a thermal sensor.

2. Brief Description of Earlier Developments

For some time, electronic devices, such as computers, have included connectors to receive electronic cards. The types and capabilities of these electronic cards, such as PC cards defined by the Personal Computer Memory Card International Association (PCMCIA), continue to expand. Future generations of electronic devices will no doubt demand greater performance from the electronic cards.

However, the heat generated by use of the PC card, or by the mere use of the electronic device, may be a concern. The heat could impair or even damage the PC card or the electronic device.

SUMMARY OF THE INVENTION

In consideration of this problem, it is an object of the present invention to provide an electrical connector that can prevent possible impairment of, or damage to, the electronic card or the electronic device due to the heat generated by the electronic card.

The present invention is a card connector that supports a PC card in a freely extractable manner and electrically connects the PC card and the electrical device, and is characterized in providing a detection means that detects the surface temperature of the supported PC card and a transmission means that transmits the obtained temperature information to this electrical device.

In this case, it is preferable that this transmission means transmits this temperature information to the electrical device via a transition port that electrically connects the PC card supported in this card connector and the electrical device.

These and other objects of the present invention are achieved in one aspect of the present invention by an electrical connector system, comprising: an electrical connector adapted to receive a mating connector; and a temperature sensor on the electrical connector for detecting a temperature of the mating connector.

These and other objects of the present invention are achieved in another aspect of the present invention by an electrical connector for an electronic card, comprising: a header; a frame associated with the header to guide the electronic card into engagement with said header; and a temperature sensor associated with the frame to detect a temperature of the electronic card.

These and other objects of the present invention are achieved in another aspect of the present invention by an electrical connector system for an electronic card, comprising: an electrical connector; a frame associated with the electrical connector; a temperature sensor associated with the frame to detect a temperature of the mating connector; and a transition board. The electrical connector and the temperature sensor are connected to the transition board.

These and other objects of the present invention are achieved in another aspect of the present invention by a method of monitoring a temperature of an electronic card in an electrical connector mounted to an electronic device, comprising the steps of: sensing the temperature of the electronic card; and transmitting the temperature of the electronic card to the electronic device.

BRIEF DESCRIPTION OF THE DRAWINGS

Other uses and advantages of the present invention will become apparent to those skilled in the art upon reference to the specification and the drawings, in which.

DETAILED DESCRIPTION OF THE PREFERRED EMBODIMENTS

Figure 1:
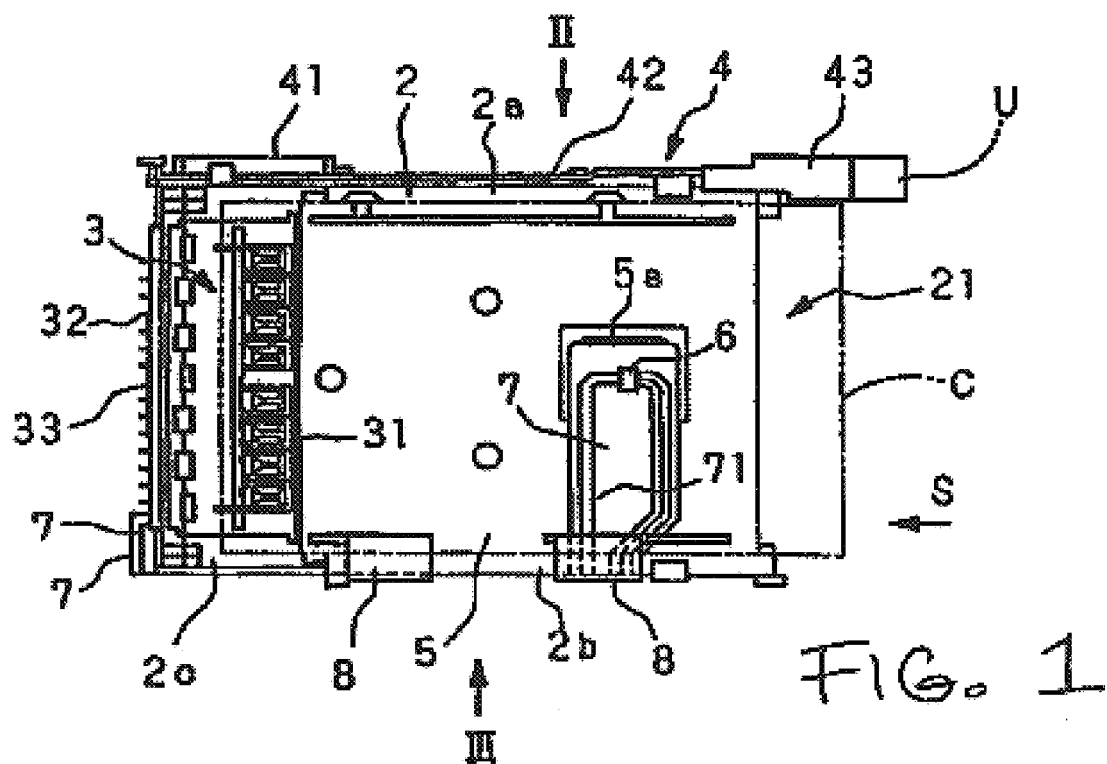
FIG. 1 is a plan view of the upper surface from arrow I in FIG. 3, showing an example of the structure of the card connector according to the present invention.
Figure 2:
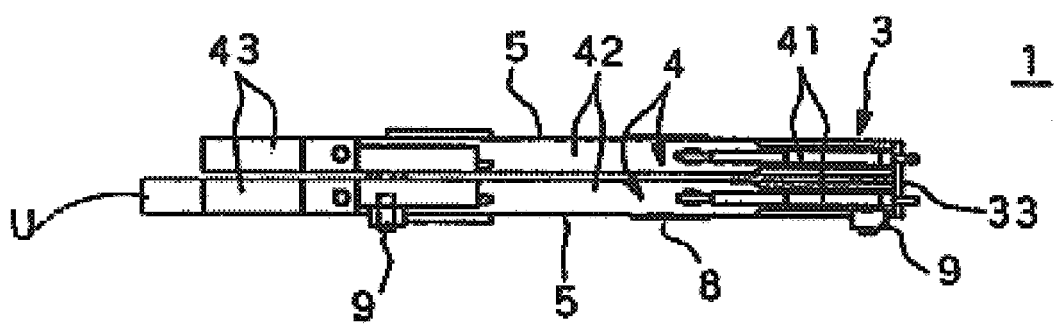
FIG. 2 is an elevational view of the side surface from arrow II in FIG. 1, showing an example of the structure of the card connector according to the present invention.
Figure 3:
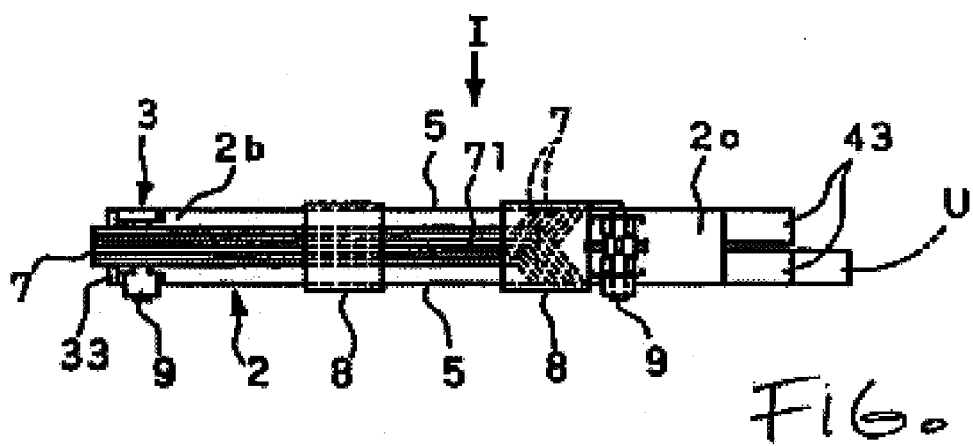
FIG. 3 is an elevational view of the side surface from arrow III in FIG. 1, showing an example of the structure of the card connector according to the present invention.

An example of the structure of the card connector according to the present invention is explained referring to FIG. 1 through FIG. 3. The card connector 1 is generally structured from a connector frame or body 2, an electrical connector unit 3 formed on one end of the connector body 2 (middle left end in FIG. 1), and an eject mechanism 4 formed on the upper surface at one end of the connector body, covers 5 that cover the connector body 2 above and below, and a temperature sensor (the detection means) 6 installed on the cover 5. Each component of card connector 1 will now be described in more detail below.

The connector body 2 could be a resinous member comprising a pair of parallel arm units 2a and 2b on the left and right, and a base 2c that connects together one end of the arm units 2a and 2b. As shown in FIG. 1, frame 2 forms a C-shaped opening towards the other edge. In addition, between arm units 2a and 2b, a space 21 for inserting the electronic card C is formed. On the opposite side surfaces that enclose the arms 2a and 2b and the space 21, upper and lower grooves (not shown) extend in the lengthwise direction of arms 2a and 2b. In addition, two PC cards (upper and lower), can be inserted into the space 21 from the other end side (as shown by arrow S in FIG. 1) by being guided by these grooves.

The connection unit 3 could be a typical PC card connector, having on the base 2b a plurality of pins (not shown) arranged along the lengthwise direction of the base 2c. The connector also includes a card bus shield 31 covering these pins from above and below. Finally, the connector 3 could include a transition board 33 (abbreviated "port" hereinbelow) that connects these pins and the card bus shield 31.

On these pins, the upper and lower PC cards C inserted into the space 21 can be respectively independently connected. In addition, the card bus shield 31 contacts the conductive surface of the PC card C inserted into the space 21, and functions as a contact electrode. At the same time, the card bus shield 31 electro-magnetically shields the inside and outside of the PC card. In contrast, the board 33 is a miniature printed circuit board installed along the base 2c, and on its side face, as shown by reference numeral 33a in FIG. 7, a plurality of holes are formed. In these holes 33a, terminals extending from the above pins and the card bus shield 31 are inserted, and fixed by a method such as soldering.

Figure 7:
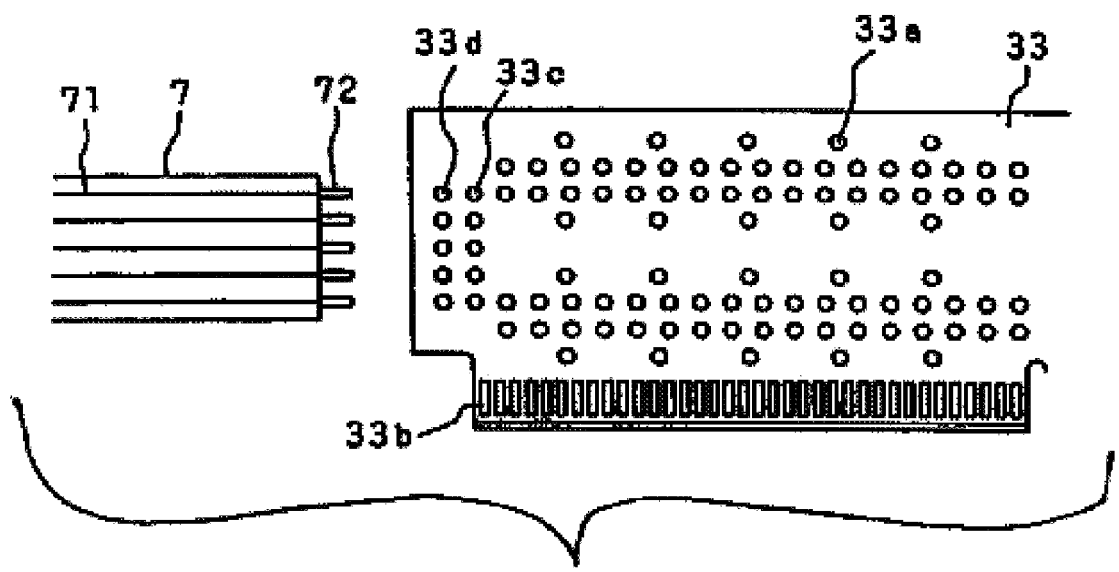
FIG. 7 is an exploded, elevational view showing, in a pre-assembled state, the flexible cable and the transition board in the card connector according to the present invention.

In addition, on the lower edge of the board 33, a plurality of connection pads or points 33b used for connecting with the electric device (not shown) are formed along the lengthwise direction of the board 33, as shown in FIG. 7. These contact points 33b communicate respectively with the individual holes 33a through known tracing. As a result, the PC card C supported in the card connector 1 connects to an electrical connector (not shown) on the electric device via these contact points 33b.

The eject mechanism 4 releases the PC card C from the card connector 1 in a known manner. The mechanism includes an attach and release mechanism (not shown) for the PC card C, an eject plate 42 on the one arm 2a of the connector body that can move along the arm 2a and engage the other end side of the connector body by a spring 41, and an operation button 43 formed on the other end side of the eject plate 42. In addition, in the case of the present embodiment, on the connector body 2, because an upper and lower PC cards C are inserted, upper and lower injector mechanisms having an identical structure are installed over one another. Other arrangements, such as the mechanisms located on opposite sides, are possible.

The cover 5 is a pair of flat upper and lower conductive members that are respectively supported by the arms 2a and 2b so as to cover from above and below the space 21. The middle of the support unit 5a includes the temperature sensor 6 positioned via the flexible cable 7 (abbreviated "transmission means" hereinafter).

Figure 4:
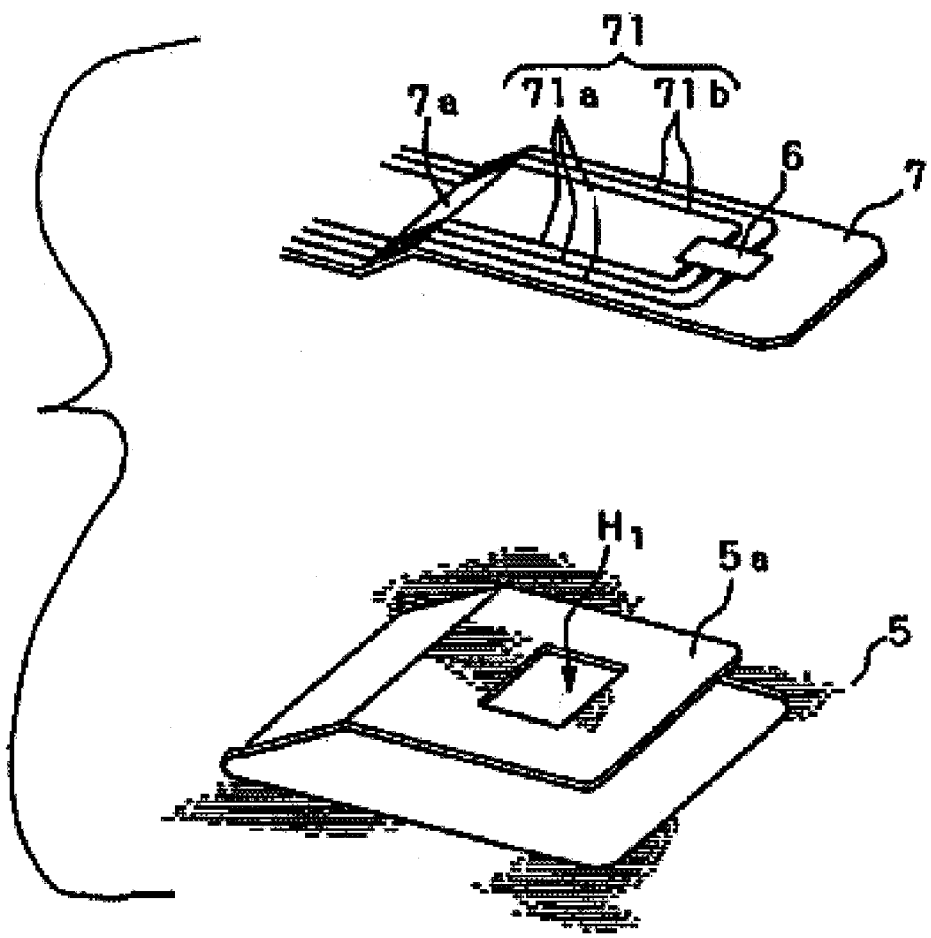
FIG. 4 is an exploded, perspective view from above showing an example of the structure of the support unit and temperature sensor in the card connector according to the present invention.
Figure 5:
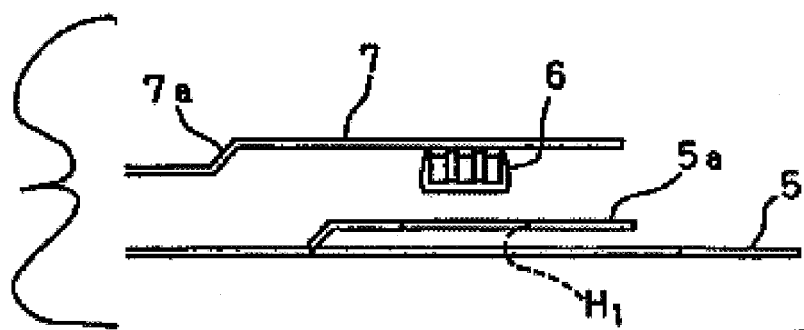
FIG. 5 is an exploded, elevational view showing, in a pre-assembled state, the support unit and the temperature sensor in the card connector according to the present invention.

The structure of the support unit 5a and the temperature sensor 6 and the installed state of the temperature sensor on the support unit 5a will be explained using FIG. 4 through FIG. 6. The support unit 5a is a central portion of the cover 5 that is punched up in a C-shape opening toward both the side on which the eject mechanism 4 is formed and the arm unit 2b on the opposite side. As seen in FIGS. 4 and 5, the support unit 5a is a formed tongue-shaped member extending in a direction away from the space 21. In addition, the center of the support unit 5a has a hole H therein. The hole H is slightly larger than the size of the temperature sensor 6.

The temperature sensor 6 is installed at one end of the cable 7 so as to protrude into the space 21. Here, the number of wires 71 connecting with the temperature sensor 6 differs depending on the specifications of the temperature sensor. In the case of the present embodiment, a TC74 type sensor made by Telcom Semiconductor could be used. This type of sensor 6 has five wires 71, including three wires 71a for signal transmission and two wires 71b for grounding.

In addition, at one end of the cable 7, a step 7a is formed curved in the cable 7 that extends away the space 21. As a result, the end of the cable 7 is set back away from the space 21.

The temperature sensor 6 is preferably mounted to the support unit 5a as shown in FIG. 5. The temperature sensor 6 extends through the hole H1 from the protruding side of the support unit 5a, as shown in FIG. 6. The support unit 5a and the end of cable 7 are positioned relative to the space 21 so that the temperature sensor 6 does not interfere with the insertion of PC card C into the space 21, but allows sensor 6 to sense the temperature of the PC card C.

The remainder of the cable is supported on the outer surfaces of the cover 5 and the support unit 5a. In other words, the temperature sensor 6 is installed on support unit 5a so that the side face of the cable 7 abuts the surface of the cover 5 and the support unit 5a. Although the use of adhesive is preferred, any method of securing the cable 7 on the cover 5 and on the support unit 5a could be used.

The cable 7 preferably avoids interference with the eject mechanism 4. As shown in FIG. 1, the cable 7 does not interact with arm unit 2a. Rather, cable 7 extends away from the ejector mechanism 4 and extends towards the arm unit 2b on the opposite side. The cable 7 then extends along the length of arm unit 2b to one edge of the connector body 3. In the case of the present embodiment, the double deck connector 1 has two pairs of covers 5. Since each deck of the connector includes a temperature sensor 6, the two cables 7 will overlap as shown by the dotted line in FIG. 3. Preferably, tape 8 is used for anchoring the two overlapping cables to the arm unit 2b.

The other end of the cable 7 extends to, and connects with, board 33. The connection state of the cable 7 with the board is explained with reference to FIGS. 7–10. The board 33 includes holes 33a. As shown in FIG. 7, a plurality of holes 33c and 33d are formed for connecting the wires 71 embedded in the cable 7. These holes 33c and 33d respectively communicate with the connection points 33b, like the holes denoted by reference numeral 33a. In the case of the present embodiment, because there are five wires 71 embedded in each cable 7, there are a total of five holes 33c, 33d.

Figure 8:
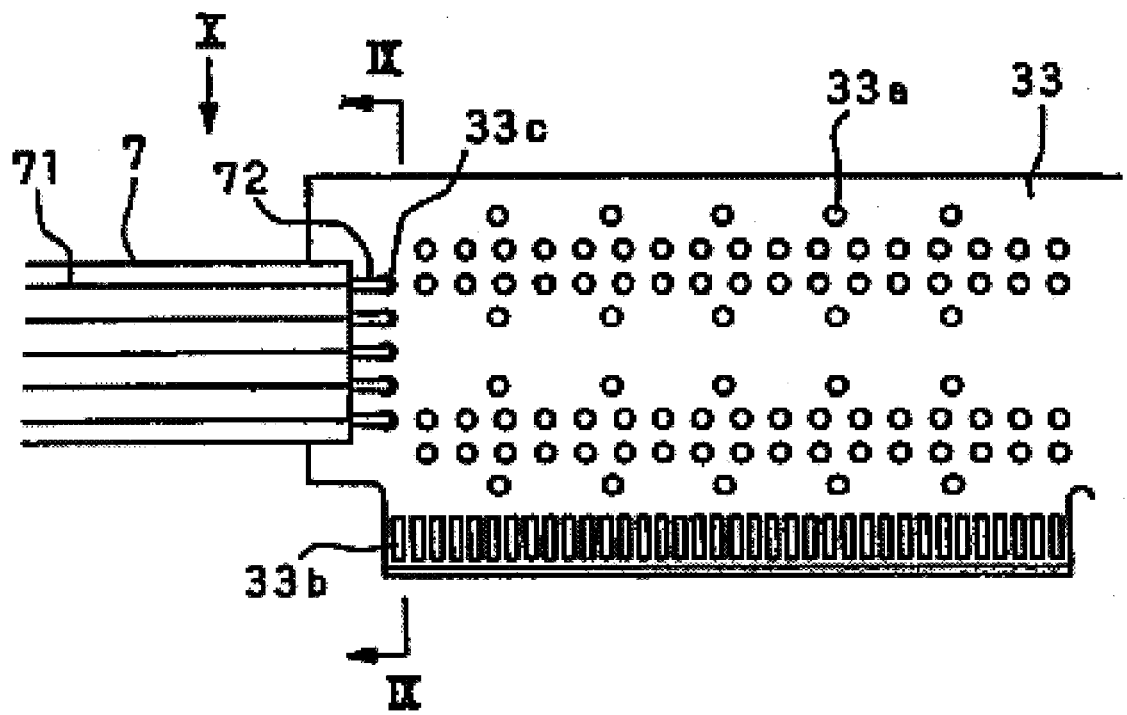
FIG. 8 is an elevational view showing an example of the connection between the flexible cable and the transition board in the card connector according to the present invention.
Figure 9:
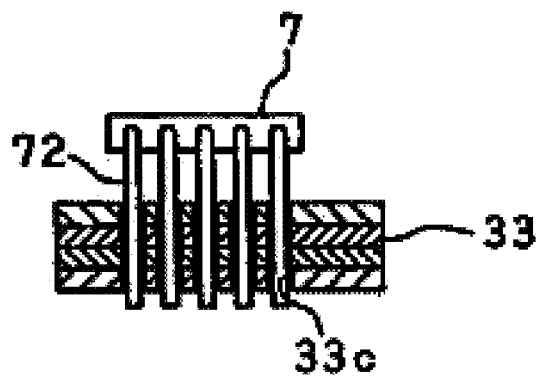
FIG. 9 is a cross-sectional view, taken along the line IX—IX in FIG. 8, showing an example of the connection between the flexible cable and the transition board in the card connector according to the present invention.
Figure 10:
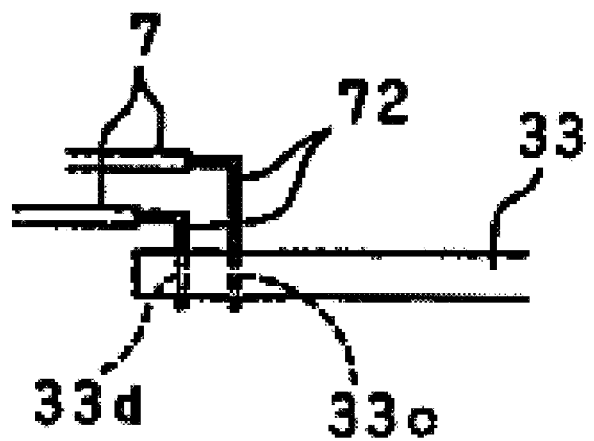
FIG. 10 is an elevational view from the arrow X in FIG. 8 showing an example of the connection between the flexible cable and the transition board in the card connector according to the present invention.

In contrast, the wire 771 are exposed from the other end of the cable 7. At the ends of these wires 71, the terminals are respectively connected. In addition, as shown in FIGS. 8 and 9, these terminals 72 are respectively inserted into the corresponding holes 33c and 33d, and anchored by a known method such as welding. Thereby, the cable is connected with the board 33. In the case of the present embodiment, as shown in FIG. 10, because there are two cables as described above, the terminal 72 extending from the respective wires are respectively inserted into the corresponding holes 33c and 33d, with the cables overlapping above and below.

In addition, reference numeral 9 denotes leg units formed on the corners of the card connector 1. The card connector is installed into the electric device by a method such as a screw via these legs 9.

In the case of supporting the PC card C in card connector 1, the PC card C is inserted into the space 21 from the other end side of the card connector 1. Thereby, the pins of the connection unit 3 are respectively inserted into the holes (not shown) formed on the distal end of the PC card C, and these pins are connected to the PC card C. At the same time, the card bus shield comes in contact with the surface of the PC card C, and as a result, the PC card C is connected to the electrical device via pins and the terminals 32 extending from the card bus shield 31, the holes 33a in the board 33, and the contact points.

In addition, when the PC card C is inserted into the space 21, the PC card C is supported in the space 21 by the aforementioned release mechanism. Furthermore; along with supporting the PC card C in the card connector 1, the eject plate 42 presses on the other end side of the connector body by the spring 41, and as a result, the operation button 43 protrudes from the other end of the card connector 1, as shown in by reference symbol U in FIGS. 1–3.

The surface temperature of the PC card C supported by the card connector 1 is detected by the temperature sensor 6. In the case of the present embodiment, on the card connector 1, upper and lower PC cards C can be supported and the surface temperature of the PC card C positioned above is detected by the temperature sensor 6 positioned on the upper side of the cover 5, and the surface temperature of the PC card C positioned below is detected by temperature sensor 6 positioned on the lower side of the cover 5. The result of the detection (temperature information) by the temperatures sensor 6 is transmitted to the electrical device via the wires 71a embedded in the cable 7, the terminals 72, the holes 33d and 33d, and connection point 33b in the board 33. In the electrical device, the results of the detection transmitted from the temperature sensor 6 are continuously monitored, and in the case that the surface temperature of the PC card C reaches a temperature higher than a pre-set temperature, a specified action, such as stopping the current to the PC card C, is carried out.

To extract the PC card C from the card connector 1, the operation button 43 is pressed towards the card connector. Thereby, the eject plate 42 moves to one end of the connector due to the resistance of the spring 41. As shown by the line in FIGS. 1–3, the operation button 43 is pressed into the card connector, and at the same time, the PC card C is supported in the space 21 is pressed from one end side of the connector body 2 by the attachment and release mechanism, and projects from the other end side of the card connector 1.

According to the card connector having the above structure, the surface temperature of the PC card C supported by the card connector 1 is detected by the temperature sensor 6, and the detection result is monitored by the electrical device. Therefore, before the PC card itself and the electrical device possibly suffer deleterious effects due to the heat generation of the PC card C, it is possible to stop the heat generation of the PC card C, and prevent the above deleterious effects.

In addition, because the cable 7 extending from the temperature sensor 6 is connected to board 33, the board 33 only connects to the electric device via the contact points 33b, and the connection between the temperature sensor 6 and the electrical device is complete. That is, according to the card connector having the above structure, the temperature sensor 6 can be simply connected to the electrical device via the board 33. No additional contacts on connector 3 are needed.

Figure 6:
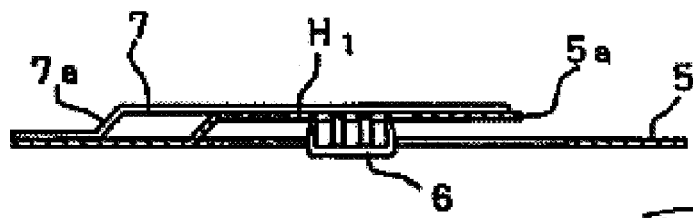
FIG. 6 is an elevational view, in partial cross-section, of the support unit and temperature sensor in the card connector according to the present invention.
Figure 11:
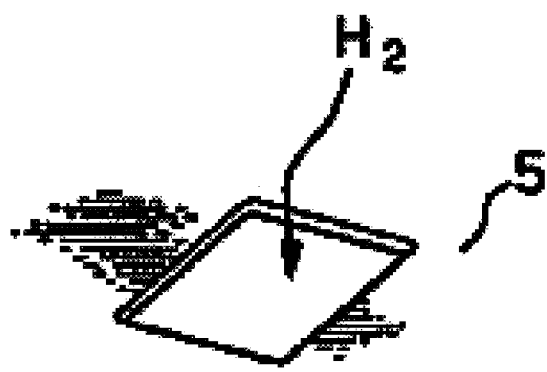
FIG. 11 is a perspective view of the hole used for the temperature sensor formed in the cover in the card connector according to the present invention.
Figure 12:
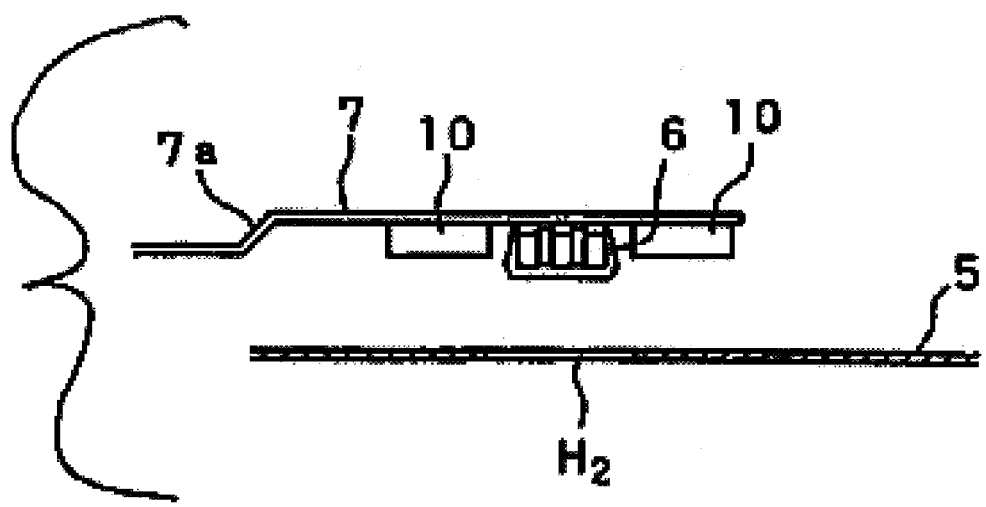
FIG. 12 is an exploded, elevational view in partial cross-section, showing, in a pre-assembled state, the temperature sensor and the support unit in the card connector according to the present invention.
Figure 13:
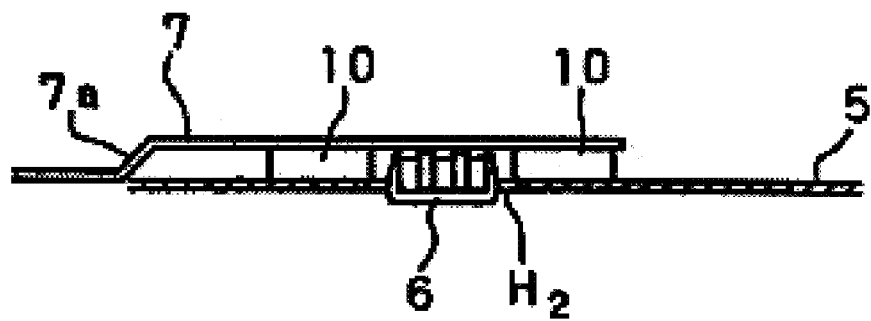
FIG. 13 is an elevational view, in partial cross-section, showing an example of the installation state of the temperature sensor on the support unit in the card connector according to the present invention.

Moreover, the installation method of the temperature sensor 6 to the card connector 1 is not limited to that shown in FIGS. 4–6. For example, FIGS. 11–13 provide an example of installing sensor 6 to connector 1. In FIGS. 11–13, the center of the cover 5 has a hole H2 slightly larger than the temperature sensor 6. In this hole H2, as shown in FIG. 12, the temperature sensor 6 is inserted from the side opposite (the upper center in the figure) the space 21. In other words, this embodiment does not require support unit 5a such as that shown in FIGS. 4–6. Rather, the cable 7 is provided with spacers 10, one on each side of hole H2. In order to properly position sensor 6, the height of spacer 10 is identical to that of the step 7 c in the first embodiment. As seen in FIGS. 12 and 13, spacers 10 surround the temperature sensor 6 from the front and back.

In addition, as shown in FIG. 13, the cable 7 and the spacer 10 are supported by the surface of cover 5 using, for example, adhesive. The temperature sensor 6 is positioned on cover 5 so as to protrude towards the space 21 side from the cover to a degree that does not interfere with the PC card C inserted into the space 21.

In yet another alternative embodiment, such as when connector 1 lacks cover 5, it is possible to install some sort of support body (not shown) over the space 21. A temperature sensor 6 is installed on the support body facing the space 21.

Although the above description provides a double deck connector 1, the number of the PC cards C supported by the card connector is not limited to an upper and lower card. The connector could accept one PC card, or more than two PC cards. Furthermore, the technique of the present invention can be applied not only to what is called a card-bus-type card connector, but may be applied to a card connector without a card bus shield as well.

In addition, for the temperature sensor 6, any well-known thermometer, such as a thermoelectric thermometer, a resistance thermometer, or a radiation thermometer, can be used if thermometer can transmit the detection results as an electric signal.

As explained above, according to the card connector of the present invention, because the surface temperature of the PC card supported in the card connector is detected by a detection means, and the obtained temperature information is monitored in the electronic device, it is possible to stop the heat generation of the PC card before the PC card itself and the electric device suffer deleterious effects due to heat generation by the PC card, and thus this deleterious influence can be prevented.

In addition, in the case that the transmission means transmitting the temperature information from the detection means to the electronic device has a structure wherein this temperature information is transmitted to the electronic device via the transition board of the card connector, because the connection between the detection means and the electronic device is completed with only the connection of the transition board to the electronic device, the detection means and the electronic device can be easily connected.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An electrical connector system, comprising:
   an electrical connector adapted to receive a mating connector, wherein said electrical connector comprises an electronic card connector and wherein said electronic card connector includes a conductive cover having an aperture therein; and
   a temperature sensor on said electrical connector positioned to detect a surface temperature of mating connector when said mating connector is received in said electrical connector and positioned to allow insertion and removal of said mating connector to and from said electrical connector, said temperature sensor extending into said aperture.

2. The electrical connector system as recited in claim 1, wherein the electrical connector includes an opening for receiving the mating connector, said temperature sensor extending into said opening.

3. The electrical connector system as recited in claim 1, further comprising a flexible circuit, said temperature sensor mounted to said flexible circuit.

4. The electrical connector system as recited in claim 1, wherein the temperature sensor is positioned to directly detect the surface temperature of the mating connector.

5. The electrical connector system as recited in claim 1, wherein the temperature sensor is positioned immediately adjacent the mating connector to detect the surface temperature of the mating connector.

6. The electrical connector system as recited in claim 1, wherein said cover includes a tab associated with said aperture, said temperature sensor mounted to said tab.

7. The electrical connector system as recited in claim 6, further comprising an ejected mechanism for extracting the mating connector.

8. The electrical connector system as recited in claim 7, wherein said temperature sensor remains a distance away from said eject mechanism.

9. An electrical connector for an electronic card, comprising:
   a header;
   a frame associated with said header to guide the electronic card into engagement with said header;
   a temperature sensor positioned to detect a surface temperature of the electronic card when said electronic card is engaged in said header, said temperature sensor and positioned to allow engagement and removal of said electronic card with and from said header; and
   a cover said header and said frame, said cover including an aperture therein to receive said temperature sensor.

10. The electrical connector as recited in claim 9, wherein said cover includes a tab associated with said aperture, said temperature sensor mounted to said tab.

11. The electrical connector for an electronic card as recited in claim 9, wherein the temperature sensor is positioned to directly detect the surface temperature of the electronic card.

12. The electrical connector for an electronic card as recited in claim 9, wherein the temperature sensor is positioned immediately adjacent the electronic card to detect the surface temperature of the electronic card.

13. The electrical connector as recited in claim 9, further comprising an eject mechanism for extracting the electronic card.

14. The electrical connector as recited in claim 13, wherein said temperature sensor remains a distance away from said eject mechanism.

15. The electrical connector system as recited in claim 9, further comprising a flexible circuit extends along said frame.

16. The electrical connector system as recited in claim 15, wherein said flexible circuit extends along said frame.

17. An electrical connector system for an electronic card, comprising:
   an electrical connector, wherein said electrical connector comprises an electronic card connector and wherein said electronic card connector includes a conductive cover having an aperture therein;
   a frame associated with said electrical connector;
   a temperature sensor positioned to detect a surface temperature of the mailing connector when said mating connector is inserted in said electrical connector, said temperature sensor positioned to allow insertion and removal of said mating connector with and from said electrical connector, said temperature sensor extending into said aperture; and
   a transition board, said electrical connector and said temperature sensor connected to said transition board.

18. The electrical connector system as recited in claim 17, wherein said connector and said temperature sensor are discretely connected to said transition board.

19. The electrical connector system for an electronic card as recited in claim 17, wherein the temperature sensor is positioned to directly the surface temperature of the mating connector.

20. The electrical connector system for an electronic card as recited in claim 17, wherein the temperature sensor is positioned immediately adjacent the mating connector to detect the surface temperature of the mating connector.

21. The electrical connector system as recited in claim 17, further comprising a flexible circuit secure to said transition board, said temperature sensor mounted to said flexible circuit.

22. The electrical connector system as recited in claim 21, wherein said flexible circuit extends along said frame.

23. The electrical connector system as recited in claim 21, wherein said flexible circuit comprises a flexible cable.

24. The electrical connector system as recited in claim 21, wherein said flexible circuit comprises a ribbon cable.

25. The electrical connector system as recited in claim 17, wherein said transition board comprises a plurality of corresponding connection points.

26. The electrical connector system as recited in claim 25, wherein said temperature sensor comprises a plurality of wires and each of said wires is disposed in one of said plurality of holes.

27. An electrical connector system, comprising:
   an electrical connector that receives a mating connector, wherein said electrical connector comprises a receptacle that receives an electronic card and wherein said mating connector comprises said electronic card; and
   a temperature sensor on said electrical connector positioned to directly detect a temperature of the mating connector when said mating connector is received in said electrical connector and positioned to allow insertion and removal of said mating connector to and from said electrical connector.

28. An electrical connector system, comprising:

an electrical connector that receives a mating connector, wherein said electrical connector comprises a receptacle that receives an electronic card and wherein said mating connector comprises an electronic card; and a temperature sensor on said electrical connector positioned immediately adjacent the mating connector to detect a temperature of the mating connector when said mating connector is received in said electrical connector and positioned to allow insertion and removal of said mating connector to and from said electrical connector.

* * * * *